Feb. 21, 1967 R. G. CONARD ET AL 3,305,194

WIND-INSENSITIVE MISSILE

Filed March 8, 1960 9 Sheets-Sheet 1

Robert G. Conard
William C. McCorkle Jr.,
INVENTORS.
BY S. T. Rotondi,
A. T. Dupont, and
Alvin E. Moore,
ATTORNEYS.

Robert G. Conard
William C. McCorkle Jr.,
*INVENTORS.*

BY S. J. Rotondi,
A. T. Dupont, and
Alvin E. Moore,
ATTORNEYS.

Robert G. Conard
William C. McCorkle Jr.,
*INVENTORS.*
BY S. J. Rotondi,
A. T. Dupont, and
Alvin E. Moore,
ATTORNEYS.

Robert G. Conard
William C. McCorkle Jr.,
*INVENTORS.*
BY S. J. Rotondi,
A. T. Dupont, and
Alvin E. Moore,
ATTORNEYS.

Robert G. Conard
William C. McCorkle Jr.,
INVENTORS.
BY S. J. Rotondi,
A. T. Dupont, and
Alvin E. Moore,
ATTORNEYS.

Robert G. Conard
William C. McCorkle Jr.,
*INVENTORS.*
BY S. T. Rotondi,
A. T. Dupont, and
Alvin E. Moore,
ATTORNEYS.

Robert G. Conard
William C. McCorkle Jr.,
*INVENTORS.*

BY *S. J. Rotondi,*
*A. T. Dupont, and*
*Alvin E. Moore,*
ATTORNEYS.

Robert G. Conard
William C. McCorkle Jr.,
INVENTORS.
S. J. Rotondi,
BY A. T. Dupont, and
Alvin E. Moore,
ATTORNEYS.

Feb. 21, 1967 R. G. CONARD ETAL 3,305,194

WIND-INSENSITIVE MISSILE

Filed March 8, 1960 9 Sheets-Sheet 9

Robert G. Conard
William C. McCorkle Jr.,
INVENTORS.
S. J. Rotondi,
BY A. T. Dupont, and
Alvin E. Moore,
ATTORNEYS.

United States Patent Office 3,305,194
Patented Feb. 21, 1967

3,305,194

WIND-INSENSITIVE MISSILE

Robert G. Conard and William C. McCorkle, Jr., Huntsville, Ala., assignors to the United States of America as represented by the Secretary of the Army Filed Mar. 8, 1960, Ser. No. 13,666
11 Claims. (Cl. 244—3.21)

The invention described herein may be manufactured and used by or for the Government for governmental purposes without the payment of any royalty thereon.

This invention relates to a wind-insensitive missile. More particularly, the invention comprises a fin-stabilized, air-traversing, non-gyroscopically-rotated missile that automatically and accurately follows its desired trajectory, utilizing during its coasting phase a simple, internal guidance-and-control system. By means of this system the accuracy-disturbing effect of ballistic-wind errors is nearly eliminated.

There are two types of errors that cause a missile or rocket to deviate from its desired trajectory: those arising from malalignment (of the missile's mass, thrust and/or aerodynamic elements); and those due to varying conditions of the atmosphere (variations in air density that affect the drag and thus the range, range winds—i.e., head and tail winds, cross winds, and gusts during flight). The inaccuracies due to malalignment during the boost phase of the missile's flight may largely be balanced out by giving the missile a slow spin, either before it leaves the launcher or very shortly thereafter. This spin is not fast enough to impart gyroscopic stability, so that the tail fins stabilize the vehicle, while the slow spin rotates and equalizes the malalignment forces that tend to throw the missile off its calculated trajectory. After this correction, the principal source of error that remains, during the boost-propulsion phase, is the force of ballistic winds. Since in short ranges the boost-propulsion period is very brief the ballistic-wind error that accumulates in this time does not appreciably affect the missile's accuracy.

Therefore, the chief current problem in securing a highly accurate short-range missile is to obviate the errors in range and azimuth that are caused by ballistic winds after booster-propulsion has ceased.

The conventional way of coping with this problem is to gather meterological data, to estimate from it the range-varying drag (due to components of the aerodynamic force that lie along the trajectory) and the deviation in azimuth (due to windage) and to allow for these estimated errors in setting the time of cutoff of booster combustion and in aiming the rocket. These steps comprise a time-consuming, somewhat expensive and inexact method of striving for accuracy, and, in military operations, may involve disclosure of positions due to the use of meterological balloons or rockets.

In view of the above facts, it is an object of this invention to provide an atmosphere-traversing missile or rocket that will closely follow its calculated, gravity-induced trajectory during flight.

Another object of the invention is to provide an atmosphere-traversing missile that comprises means for automatically compensating for the effect of ballistic winds on it during the coasting or free-flight phase of its course.

A further object of the invention is to provide a fin-stabilized missile that comprises a rotary shell whose rotation largely cancels the effect of thrust malalignment, a booster, a sustainer, and means for automatically balancing the thrust of the sustainer and the drag of the missile.

The foregoing and other objects of the invention will become more fully apparent from the following detailed description of exemplary structure embodying the invention and from the accompanying drawings, in which.

Figure 8:
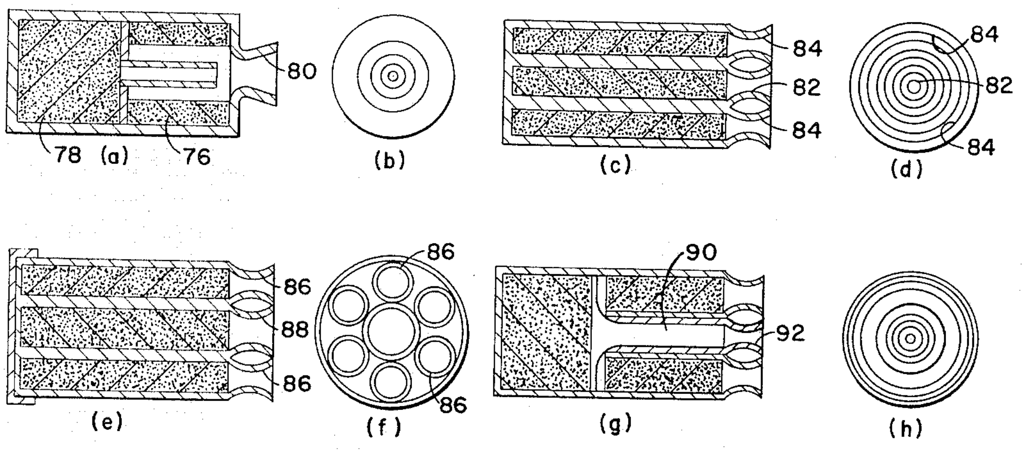

FIGURE 8 schematically shows, in section and in end elevation, four alternative forms of interrelation of the booster and sustainer elements of the invention.

Figure 9:
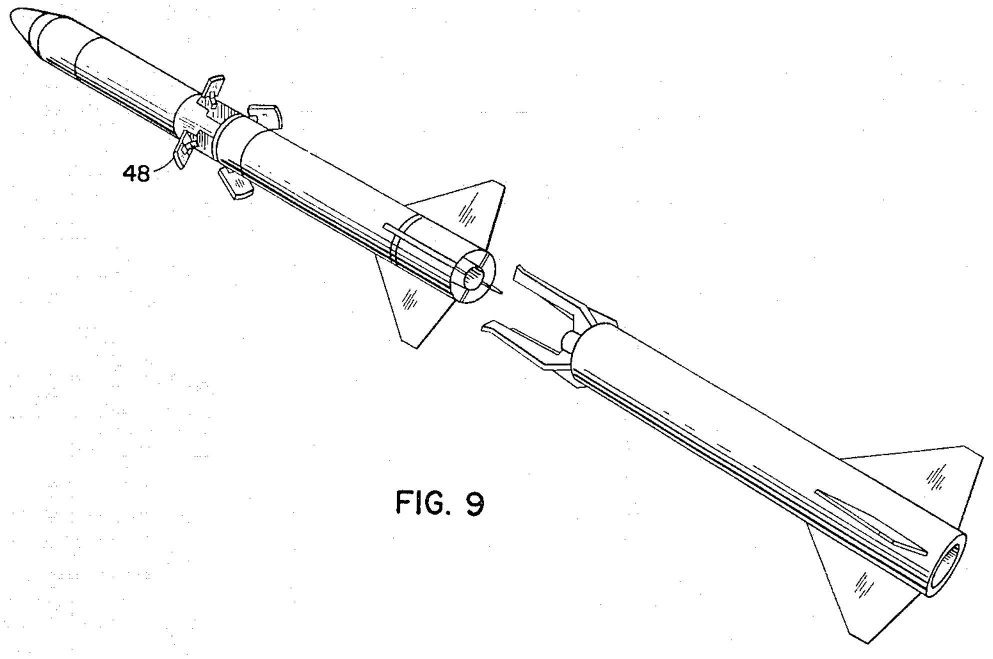

FIGURE 9 is a perspective view of a third form of the invention.

Figures 10, 11:
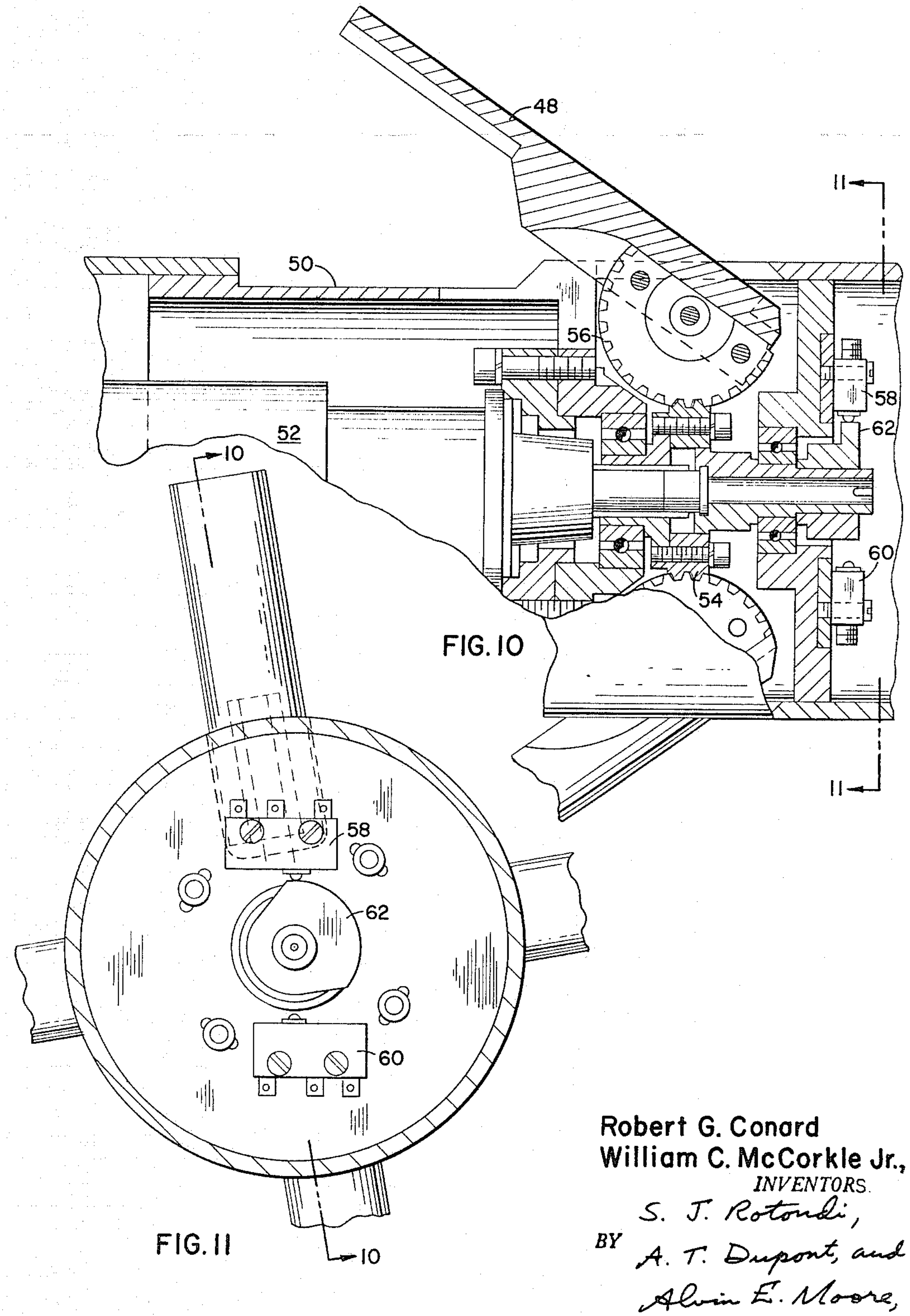

FIGURE 10 is an elevational view, in section from the plane 10—10 of FIGURE 11.

FIGURE 11 is a detail, sectional view from the plane 11—11 of FIGURE 10.

Figure 12:
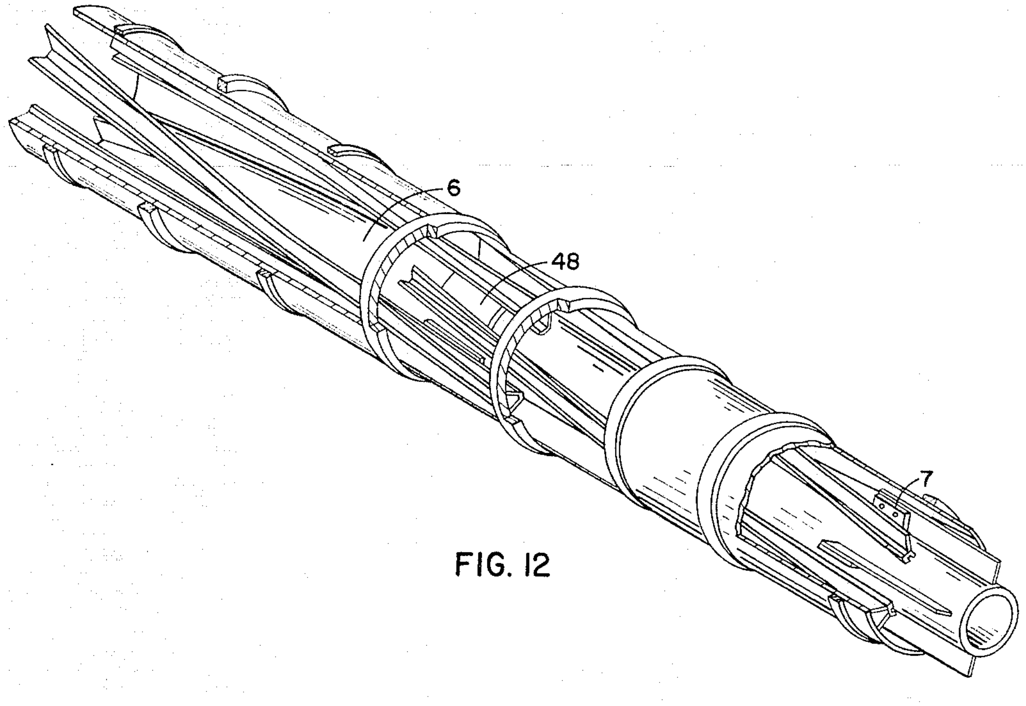
Figure 13:
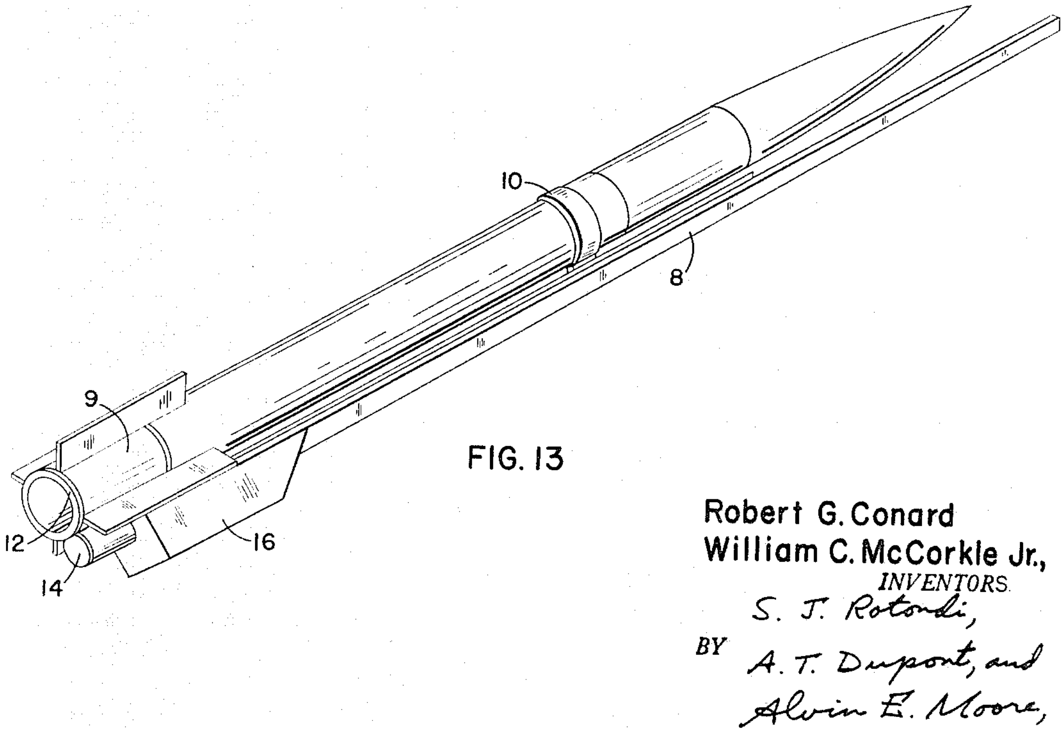
Figure 14:
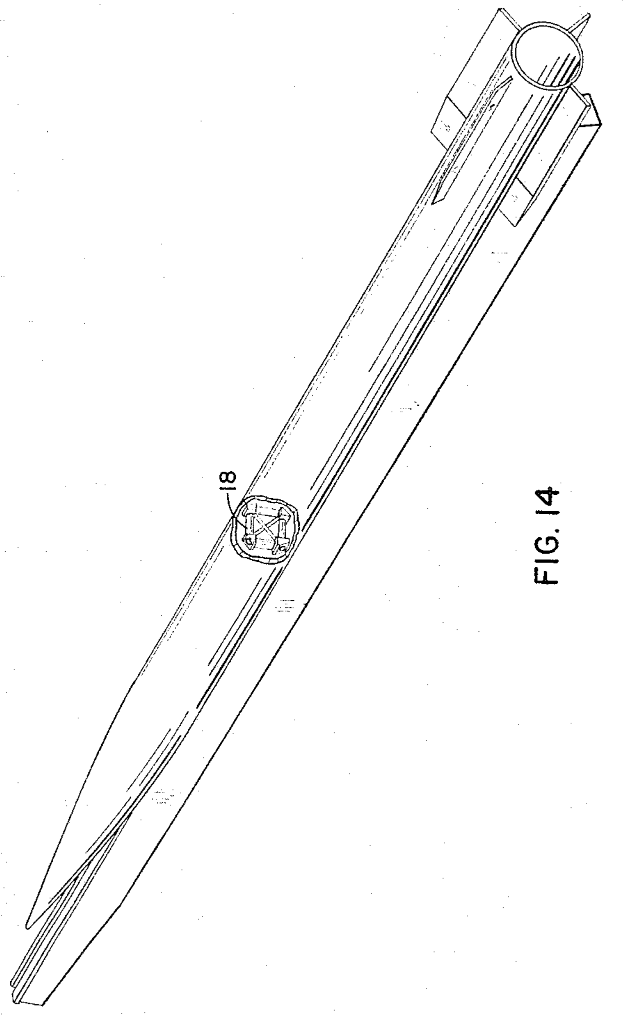

FIGURES 12, 13 and 14 are semischematic perspective views of alternative mechanisms for giving the missile a slow spin.

Although a missile that utilizes a rocket motor is shown in these drawings, the invention may be utilized with any other type of missile propulsion.

Figure 1:
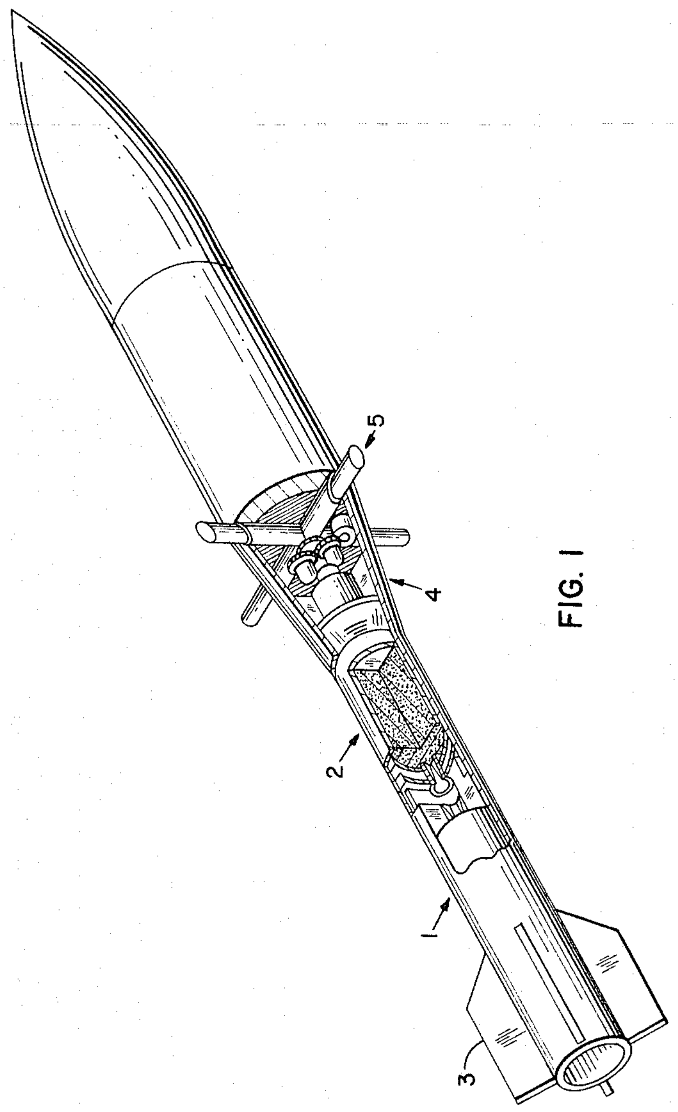
FIGURE 1 is a semischematic perspective view of one form of the invention.

In FIGURE 1, the composite missile or rocket of the invention is shown as comprising a booster 1, a sustainer (drag-balancing, auxiliary rocket motor) 2, stabilizing fins, 3, an autopilot 4, and a drag-brake assembly 5. The preferred type of booster is shown in FIGURES 1, 2, 6 and 7 as fixed to the sustainer 2, and adapted for the sustainer's exhaust to pass thru or around the booster casing. However, in lieu of this adaptation the type of booster shown in FIGURE 9 may be utilized, and separated from the sustainer in flight.

Fins 3 have a slight cant relative to the longitudinal axis to induce a slow roll of the rocket. The angular speed of this rotation is not enough to cause gyroscopic stability and resulting precession of the missile, but is sufficient to equalize any inaccuracies of thrust and aerodynamic malalignment thru the 360 degrees of the slow roll.

Although the fins alone would provide such rotation soon after the rocket leaves the launcher, it is preferred to spin the principal mass of the missile prior to its launching. This is done by means of one of the alternative launchers shown in FIGURES 12 and 13. The launcher of FIGURE 12 has four helical rails, each of which during the launching of missile 6, engages a wear plate, 7, fixed to one of the fins. This engagement sets the fins, and the rocket, in rotation. In FIGURE 13 the rocket is launched from a straight rail 8. During the launching the fin-carrying collar 9, to which the rear launching shoe is fixed, and the forward shoe-holding ring 10 do not rotate, whereas the remainder of the missile is set in rotation prior to the launching by means of friction collar 12, friction wheel 14, and a servo motor and gearing that are within housing 16.

A third alternative means for giving the rocket an early spin is shown in FIGURE 14. In this form of the invention, the rocket is launched from a straight-rail, and immediately after launching the set of auxiliary rockets 18 is fired by a timing or an acceleration-responsive device. Thus, the missile is set in rotation at the proper speed immediately after it is launched.

Also, shortly after the launching, the fins 3 begin to arrow-stabilize the missile along its calculated trajectory. Since the thrust and aerodynamic malalignments that are caused by lack of exact balance of structure in manufacture and by uneven burning of the booster propellant are largely nullified by the slow rotation, the fins cause the rocket to point into the relative wind.

During the propulsive phase the relative wind has a direction and a drag-inducing force that is largely determined by the resultant of the components of the booster's thrust and the ballistic wind on the missile, both of which vary in magnitude. One way of compensating for the relative wind during the propulsive phase comprises using a set of accelerometers that are sensitive to departures of the missile from its desired trajectory relative to the pitch, roll and yaw axes, and sending signals from the accelerometers to jet vanes or other attitude control mechanism. In short-range missiles, however, such extra complication is not necessary, because the booster-burning period is quite short, and is insufficient to cause the missile to accumulate a significant error in range or azimuth prior to termination of the booster thrust.

This termination may be effected by means of a signal from a known timing device or velocity-measuring integrating accelerometer. This signal ends the booster propulsion. One of the optional ways in which the termination may be effected comprises energization of detonator block 19 (shown in FIGURE 2) by signal current from conductor 20, the firing of fragmental explosive charge 22, and the consequent disruption of carbon nozzle insert 24. Another way is by separating the booster from the sustainer and payload, as shown in FIGURE 9, by the use of known explosive or fluid-operated separation means, actuated in response to the booster-cutoff signal.

Figure 4:
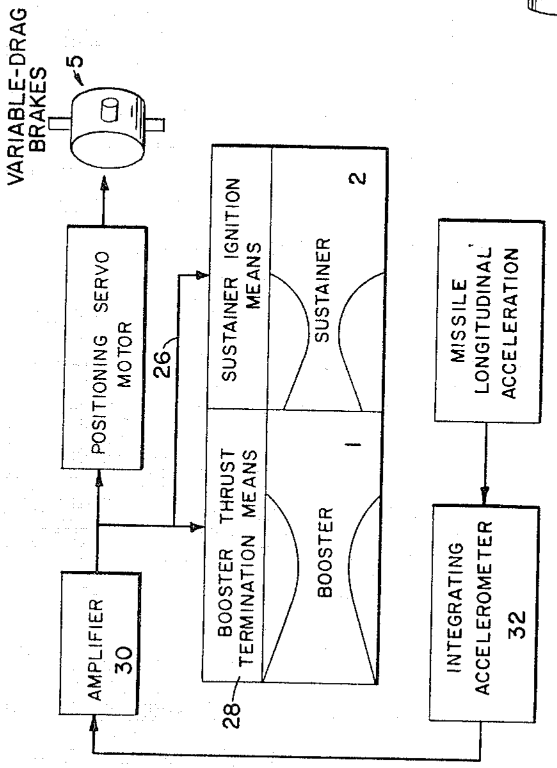
FIGURE 4 is a block diagram of a simple form of the propulsion and guidance and control elements of the invention.
Figure 5:
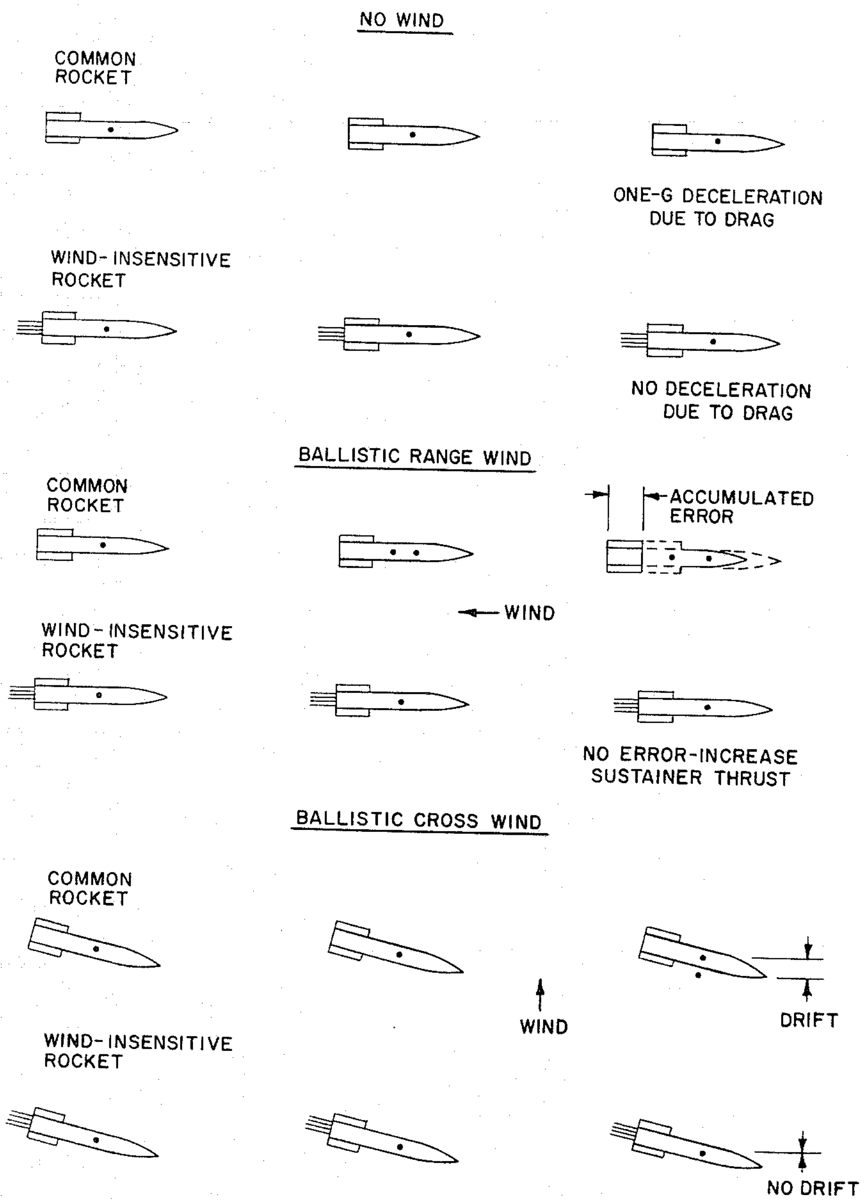
FIGURE 5 is a diagram indicating the errors of drag and windage that are obviated by the invention.

At about the time the booster's thrust is terminated a signal from the timing device or integrating accelerometer causes the ignition of the sustainer motor 2 by firing a spark plug or other igniter. In the form of the control system schematically indicated in FIGURE 4, this ignition signal, 26, is the same electric current that fires booster-thrust termination means 28. This current comes via amplifier 30 from integrating accelerometer 32. Just before launching the rocket, a velocity reference number representing the desired thrust-termination velocity is set in the guidance system. In known manner, the accelerometer integrates the acceleration during booster propulsion, providing an actual reference velocity. When this reference velocity equals the velocity reference number, signal 26 is formed.

Figure 2:
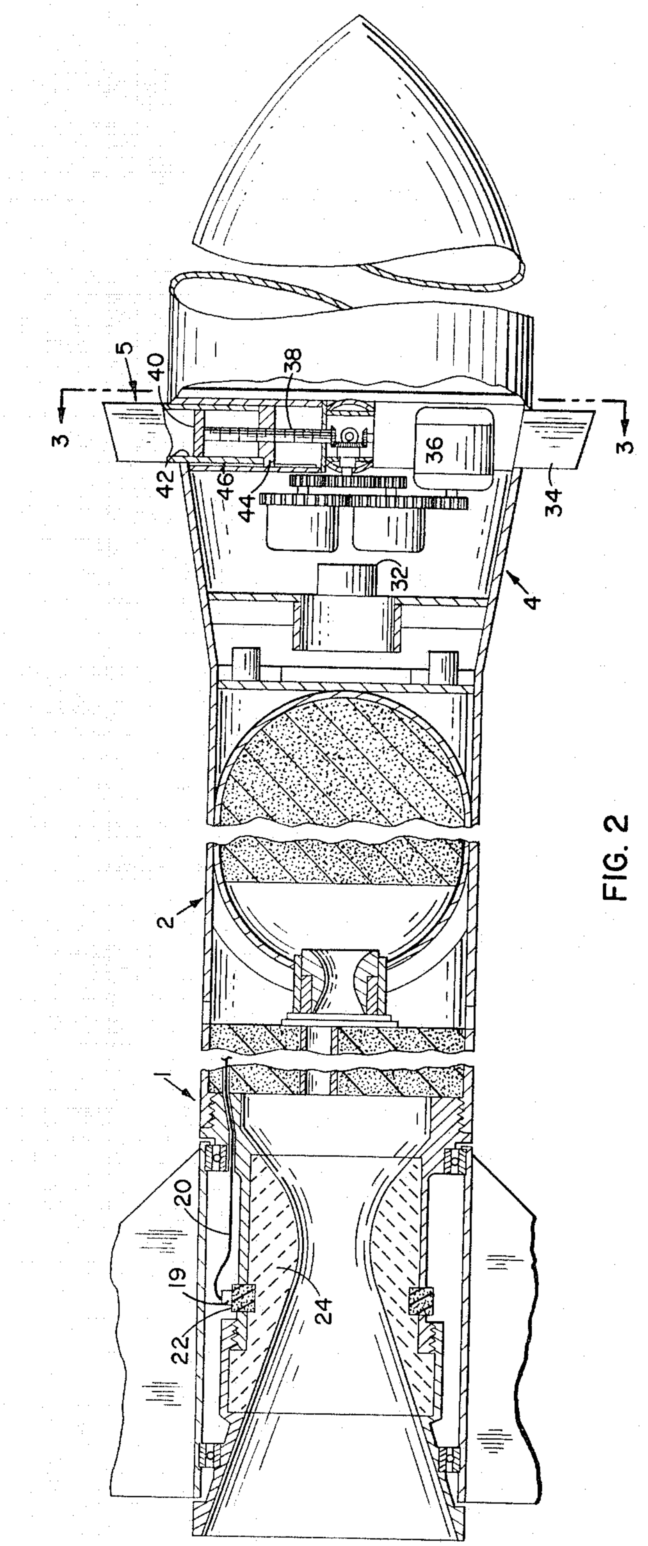
FIGURE 2 is a semischematic view in elevation, partly in section to show details of the booster and sustainer motors and the drag brakes.

As shown in FIGURE 2, this accelerometer, 32, is mounted along the longitudinal axis of the missile. Preferably, it is also mounted at the rocket's center of gravity. Any known type of integrating accelerometer, e.g., a gyroscopic accelerometer, may be used. Preferably, however, a known, floated-piston type of instrument is mounted on the missile, with the piston's longitudinal axis coinciding with the longitudinal axis of the missile. The acceleration-caused variation in electrical capacitance between the ends of the fluid-filled chamber, in which a piston is floated, gives rise to a signal.

The thrust of sustainer 2 is calculated to balance the drag of the missile when its drag brakes 5 are retracted and it is at a lower level of its flight. At an upper level, after the sustainer is ignited, cancellation of the accuracy-disturbing effect of the drag is achieved by extending the drag brakes until the total drag of the missile and the brakes, combined, is equaled by the thrust of the sustainer. This balancing out or cancellation of the effect of the drag is continually and automatically achieved during the flight of the missile after the termination of booster propulsion. Since the drag is cancelled the rocket is not substantially moved from its trajectory by ballistic winds that are encountered. Although the missile is oriented by its tail fins so that it points into the relative wind, the drag of this wind is balanced out, so that the rocket's center of gravity moves along its desired trajectory, and at its desired, drag-free velocity, affected only by gravity.

The unavoidable slight lag in the correcting operation of the system after a change in wind would prohibit the controls from compensating for most gusts. It has been discovered, however, that the directions and forces of a series of gusts balance out their effects.

Figure 3:
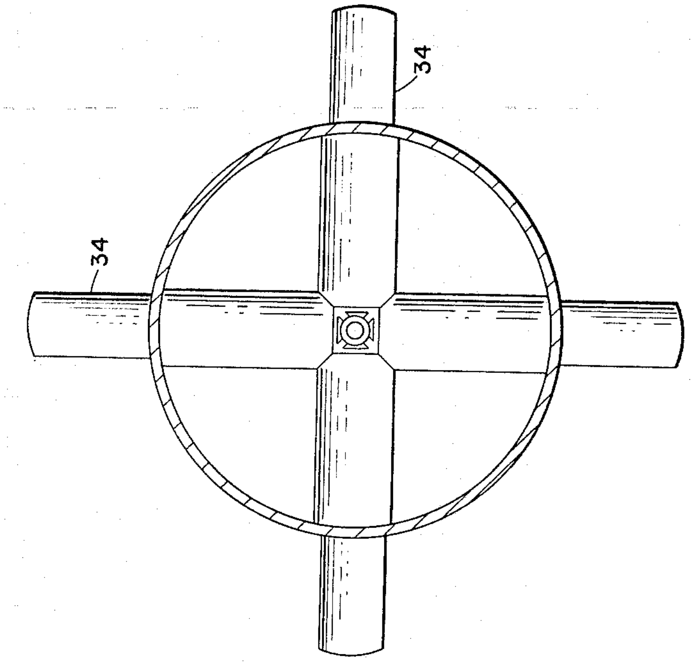
FIGURE 3 is a sectional view from the plane 3—3 of FIGURE 2, but showing the drag brakes as in fully extended position.

In the form of FIGURES 2 and 3, there are shown four drag brakes 34, that are mounted for perpendicular movement relative to the missile shell. In response to a signal from the accelerometer, these brakes are reciprocated outward or inward by electric motor 36, by means of any feasible rotary-to-reciprocable mechanical movement. In the form of FIGURE 2, reversible electric motor 36 actuates reduction gearing to turn four screws 38. Each screw has on its outer end collar 40 which fits closely in but may turn relative to cylindrical recess 42 in the drag brake. The root of the brake is affixed to a key 44 which slides in slot 46, thus preventing the brake, as it is reciprocated, from turning relative to the missile shell.

FIGURES 9, 10 and 11 illustrate an alternative type of drag brakes. In this form, a plurality of brakes 48 may be pivoted from positions within recesses 50 in the missile shell to positions that are substantially normal to the longitudinal axis of the missile. Each brake is pivoted in response to a signal from the accelerometer by means of reversible electric motor 52. The motor is drivably connected to the brakes thru reduction gearing which comprises worm 54 and segmental worm gears 56 that are fixed to the roots of the drag brakes. Optionally, limit switches 58 and 60, actuated by cam 62, may be utilized to stop the motor when the brakes have reached their outer or inner position.

Figure 6:
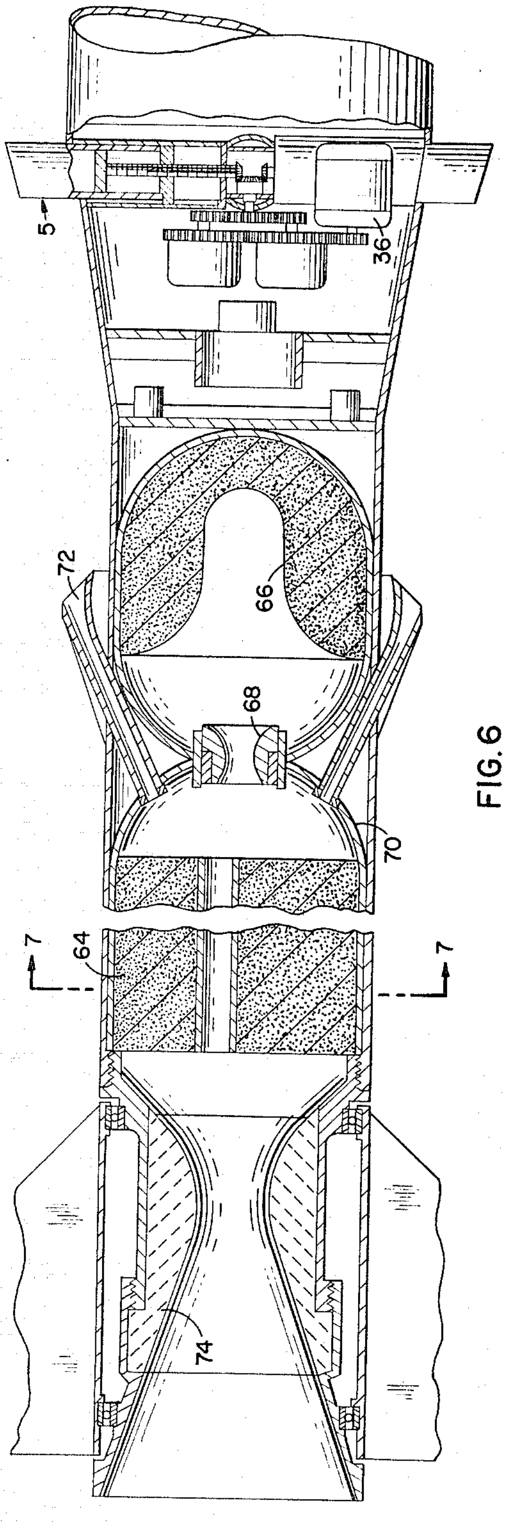
FIGURE 6 is a semischematic view in elevation, partly in section to show details, of a second form of the invention.
Figure 7:
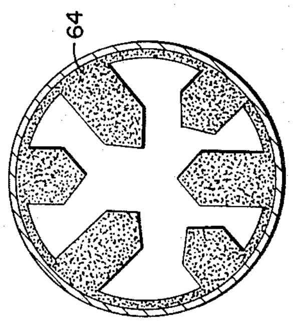
FIGURE 7 is a sectional view from the plane 7—7 of FIGURE 6.

In the form of the invention shown in FIGURE 6 there is no necessity to explode the nozzle carbon insert. After booster propellant 64 is used sustainer propellant 66 is fired. Propellant 66 has enough oxygen to continue burning but not enough for complete combustion until after it is ejected thru nozzle 68. Within booster casing 70 (now empty of propellant 64) the incompletely burned gases are further burned in air that is rammed into casing 70 thru four ducts 72. The resulting gases are then ejected thru the relatively large booster nozzle 74.

FIGURE 8 shows four other arrangements of the booster and sustainer propellants. Sub-figures 8(*a*) and 8(*b*) schematically illustrate the booster propellant 76 and sustainer propellant 78 as being in the same casing and adapted to expel gases out of the same nozzle, 80. In sub-figures (*c*) and (*d*) the booster propellant fires thru central nozzle 82, and later the sustainer propellant fires thru annular nozzle 84. Sub-figures (*e*) and (*f*) show multiple booster nozzles 86, having their centers on a circle, while nozzle 88 for the sustainer gases has a throat circumferentially extending around the center of said circles. In sub-figures (*g*) and (*h*), the nozzles are similar to those of sub-figures (*c*) and (*d*), but the sustainer propellant is fired thru blast tube 90, where the gases are more completely burned, before they are expelled thru central nozzle 92.

The invention comprehends various obvious changes in structure from that herein illustrated, within the scope of the subjoined claims.

The following invention is claimed:

1. A fin-stabilized, atmosphere-traversing missile disposed for flight in a predetermined trajectory including booster propulsion and sustainer propulsion phases of flight, said missile comprising: a rotary housing assembly; fins fixed to the outside of said assembly, each fin being at a slight angle to a plane thru the longitudinal axis of the missile, whereby the missile is arrow-stabilized, is rotated at a non-gyroscopic speed, and the accuracy-disturbing effect of thrust malalignment largely is balanced out; a booster within said housing assembly; thrust termination means disposed for thrust termination of said booster at a predetermined velocity of said missile; a sustainer within said assembly; ignition means for firing said sustainer subsequent to booster thrust termination; an accelerometer mounted substantially at the center of gravity of the rocket, for providing an electric signal for sequential actuation of said booster thrust termination means and sustainer ignition means, said accelerometer further disposed for measuring the axial component of the acceleration due to a change in the algebraic sum of the sustainer's thrust and the missile's aerodynamic drag during the post-booster-propulsion phase of the missile's flight and for supplying a signal that is a measure of said axial component of the acceleration; drag brakes mounted on the missile for movement relative to said housing assembly, into or out of said relative wind, whereby the aerodynamic drag of the missile in said wind may be varied; and means drivingly connecting said motor to said accelerometer whereby said motor and said drag brakes are operated in response to said signal.

2. A device as set forth in claim 1, in which said housing assembly comprises two separable parts, with one part comprising a housing for said sustainer, and another part comprising a housing for said booster.

3. A device as set forth in claim 1, in which: said housing assembly comprises fixedly attached booster and sustainer sections; said booster comprises a nozzle at the stern of said missile and solid propellant forward of said booster nozzle; and said sustainer comprises a nozzle having a throat that is smaller than that of said booster nozzle and solid propellant forward of said sustainer nozzle, whereby the propulsive gases of said sustainer are ejected thru said sustainer nozzle, said booster section and booster nozzle.

4. A device as set forth in claim 3, which further comprises a plurality of air ducts mounted on said sustainer section, one end of each duct being open to the atmosphere and located outside and adjacent to said sustainer section, and the other end of each duct opening into said booster section.

5. A device as set forth in claim 1, in which said drag brakes are pivotally mounted on said housing assembly.

6. A device as set forth in claim 1, in which said drag brakes project thru openings in said housing assembly and are mounted for movement relative to said openings and normal to said longitudinal axis.

7. A device as set forth in claim 6, in which said means drivingly connecting said motor and brakes comprises: a screwthreaded element on the root of each brake; a screwthreaded rod coacting with said element to reciprocate said brake; and means driven by said motor simultaneously to rotate said screwthreaded rods.

8. A device as set forth in claim 1, in which: said booster comprises a single nozzle, thru which the propulsive gases of said booster and sustainer are ejected; said booster comprises solid propellant adjacent to said nozzle; and said sustainer comprises solid propellant located in said housing assembly forward of said booster.

9. A device as set forth in claim 1, in which: said booster comprises a plurality of nozzles, with the center of each nozzle outlet located on a circle that is centered on said longitudinal axis; and said sustainer comprises a nozzle having an outlet that is located within said circle.

10. A device as set forth in claim 1, in which: said booster comprises solid propellant arranged in an annulus and an annular nozzle; and said sustainer comprises solid propellant within said annulus and a nozzle located within said annular nozzle.

11. A missile comprising: a rotary housing assembly; means for rotating said housing assembly at a non-gyroscopic speed; fins fixed to the outside of said assembly, whereby said missile is arrow-stabilized, with its longitudinal axis aligned with the direction of the relative wind on the missile; a booster within said housing assembly; thrust terminating means disposed for terminating thrust of said booster at a predetermined velocity of said missile; a drag-counteracting auxiliary rocket motor within said housing assembly; ignition means for firing said auxiliary rocket motor when the propulsive thrust of said booster is ended; an accelerometer substantially at the center of gravity of the missile, for providing an electric signal for sequential actuation of said booster thrust termination means and auxiliary rocket motor ignition means, said accelerometer further disposed, constructed and arranged to measure the acceleration that results from a change in the algebraic sum of the sustainer's thrust and the missile's aerodynamic drag during the post-booster-propulsion phase of its flight; means connected to said accelerometer, comprising an electric source of power and a conductor, for supplying an electrical signal proportional to said acceleration; means of variable position relative to said longitudinal axis for balancing the thrust of said sustainer and the drag of said housing assembly and fins; and means for controlling the position of said last-named means comprising a motor connected to said last-named means and to said conductor.

References Cited by the Examiner

UNITED STATES PATENTS

| | | | |
|---|---|---|---|
| 1,879,187 | 9/1932 | Goddard | 102—49 X |
| 2,145,508 | 1/1939 | Denoix | 102—51 |
| 2,396,321 | 3/1946 | Goddard | 244—76.9 |
| 2,515,048 | 7/1950 | Lauritsen | 60—35.6 |
| 2,549,020 | 4/1951 | Seldon | 244—76.7 X |
| 2,661,691 | 12/1953 | Brandt | 60—35.6 |
| 2,724,237 | 11/1955 | Hickman | 60—35.6 |
| 2,766,581 | 10/1956 | Welsh | 102—49 |
| 2,799,987 | 7/1957 | Chandler | 60—35.6 |
| 2,835,199 | 5/1958 | Stanly | 102—50 |
| 2,840,326 | 6/1958 | Richardson et al. | 244—113 |
| 2,870,711 | 1/1959 | Barr et al. | 102—50 |
| 2,979,284 | 4/1961 | Genden et al. | 244—14 |
| 2,993,413 | 7/1961 | McCormack | 244—113 |
| 3,000,597 | 9/1961 | Bell et al. | 102—49 |
| 3,118,377 | 1/1964 | Davies et al. | 102—49 |

BENJAMIN A. BORCHELT, *Primary Examiner.*

SAMUEL BOYD, *Examiner.*

SAMUEL FEINBERG, F. J. LEES, V. R. PENDEGRASS, *Assistant Examiners.*